United States Patent
Wako

(10) Patent No.: US 7,640,241 B2
(45) Date of Patent: Dec. 29, 2009

(54) SPORTS INFORMATION VIEWING METHOD AND APPARATUS FOR NAVIGATION SYSTEM

(75) Inventor: Hikaru Wako, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 320 days.

(21) Appl. No.: 11/729,555

(22) Filed: Mar. 29, 2007

(65) Prior Publication Data
US 2008/0243926 A1 Oct. 2, 2008

(51) Int. Cl.
*G06F 17/30* (2006.01)
(52) U.S. Cl. .......................................... 707/5
(58) Field of Classification Search ........................ None
See application file for complete search history.

(56) References Cited

U.S. PATENT DOCUMENTS

| | | | |
|---|---|---|---|
| 7,088,909 B1 | 8/2006 | Wordemann | |
| 2003/0195670 A1* | 10/2003 | Smith et al. ..................... 701/1 |
| 2004/0243300 A1* | 12/2004 | Nakajima ..................... 701/200 |
| 2005/0266793 A1* | 12/2005 | Grossman et al. ........... 455/3.01 |

FOREIGN PATENT DOCUMENTS

JP 2002-290856 10/2002

* cited by examiner

*Primary Examiner*—Uyen T. Le
(74) *Attorney, Agent, or Firm*—Muramatsu & Associates

(57) ABSTRACT

A sports information viewing method for a navigation system designed for receiving sports information and displaying the sport information in multiple windows on a display device, the method performs a step of forming a database of sports information including current sports information and past sports information in a memory, a step for setting a keyword and priority for retrieving the sports information, a step for retrieving the sports information according to the keyword and the priority, a step for sorting the sports information according to a predetermined order, and a step for displaying the retrieved sports information on the display device.

20 Claims, 11 Drawing Sheets

Fig. 3A
Map Information

| | |
|---|---|
| Road Layers | Road Link Data (RLDT), Node Link Data (NDDT), Intersection Data (CRDT) |
| Background Layers | Figure data representing objects displayed on a background, such as roads, building, parks and lakes . |
| Character Layers | Character data such as names of cities, towns and villages. |
| PIO Layers | Name of PIO (Point Of Interest), Coordinates (longitude, latitude), catergry of the PIO, Link-contstituting node of road link, etc. |

Fig. 3B
POI Information

| COODINATES (LONGITUDE /LATITUDE) | POI ICON | NAME OF ADJACENT ROAD | LINK (NODES N1 AND N2) | CATEGORY | NAME |
|---|---|---|---|---|---|
| (X1, Y1) | STD | ---- | ---- | SPROTS FACILITY | AA STADIUM |
| (X2,Y2) | R | ---- | ---- | | |

Fig. 3C
Sports Information

| TIME, DATE | CATEGORY | TEAMS | PLACE | SCORE | PLAYER INVOLVED |
|---|---|---|---|---|---|
| 13:24:05 02 18 06 | FOOTBALL | AAA BBB | AA STADIUM | 0 14 | PLA-1 PLB-3 |
| 11:03:46 02 18 06 | BASKETBALL | CCC DDD | XXX STADIUM | 36 42 | --- --- |

SPORTS INFORMATION VIEWING METHOD AND APPARATUS FOR NAVIGATION SYSTEM

FILED OF THE INVENTION

The present invention relates to a method and apparatus for navigation system, and more particularly, to a sports information viewing method and apparatus for a navigation system which is capable of displaying favorite team sports information such as a score of the game, highlights of the game, a ranking in a league to which the team belongs, etc., while performing navigation functions.

BACKGROUND OF THE INVENTION

A navigation system, for example, equipped with a vehicle, for assisting a user (driver) for smoothly traveling to the destination has become popular. Such a navigation system detects the current position of the user (vehicle), reads out map data pertaining to an area at the current position from a data storage medium, such as a CD-ROM (compact disc read-only memory), a DVD (digital versatile disc) or a hard disc. Alternatively, such map data can be provided to the user from a remote server through a communication network such as Internet.

While traveling to a destination, a user of a navigation system (ex. a driver of the vehicle) sometimes wants to listen to the music or score of games of favorite sports teams. Particularly, when a football season, a basketball season or a hockey season starts, the user who is a football enthusiast, etc., having a favorite team or favorite players wants to know the score of the game and other associated sports information as soon as the score changes in the game or the game finishes.

For those people who are sports enthusiasts, several commissions such as NBA (National Basketball Associations), NFL (National Football League) and NHL (National Hockey League) provide sports information including schedules of the game, scores of the game, information on players, etc., through communication means such as internet, public telephone network, cellular phone network and some broadcasting service companies including satellite radio stations. Such sports information may also be provided by a sports information service provider to subscribers through the communication means.

However, in order to obtain necessary information, the user needs to select or to access the necessary information through several selection operations while moving to the destination. Particularly, conducting the selection operation for obtaining the necessary information is dangerous for the driver when driving a vehicle. Further, it is also dangerous to receive the necessary information through a cellular phone while driving a vehicle because the driver has to operate necessary key-input process to access necessary sports.

Further, in general, people tend to be interested in local teams of football, basketball, hokey, college sports teams, etc., within the area where the user lives or works. Particularly, when a big game is scheduled in a local stadium or arena of the team, the user wants to know the highlight of the game, score of the game even when he/she is driving a vehicle on the way to the office or on the way to his/her home.

It is possible to listen to the sports radio programs or television programs through a radio or a television in a vehicle while using the navigation system in the vehicle. For example, Japanese Patent Application Laid-Open No. 2002-290856 discloses a digital television receiver for such a purpose. The digital television receiver is capable of receiving data broadcasting including information, extracting necessary information from the data broadcasting according to the keyword registered in a memory in advance, and displaying the necessary information.

However, in the digital television receiver, in order to access the necessary sports information, the user needs to control several different buttons or switches on the receiver such as a radio, a navigation system and a television set and tune to the target station. Further, the user needs to listen to unnecessary information, such as advertisement associated with the program with which the sports information is transmitted. Particularly, for sports enthusiast for local sports teams, they always concern games held in home stadiums, arenas and grounds.

It is difficult for them to access all information related to the games held in the local stadiums, arenas and grounds in the local areas while traveling with use of the conventional methods and apparatuses described above. Therefore, there is a need of a new method and apparatus for a navigation system to easily and efficiently receive and view the sports information while traveling.

SUMMARY OF THE INVENTION

It is, therefore, a first object of the present invention is to provide a sports information viewing method and apparatus for a navigation system which is capable of retrieving and displaying favorite team sports information sorted by distance from a current position to places where the games are held, with a simpler operation to obtain necessary sports information while traveling.

It is a second object of the present invention to provide a sports information viewing method and apparatus for a navigation system which allows the user to easily access the sports information by giving voice commands without manipulating switches or keys on the navigation system while traveling.

The first object of the present invention can be achieved by a sports information viewing method comprising the steps of: (1) forming a database of sports information including current sports information and past sports information in a memory; (2) setting a keyword and priority for retrieving the sports information; (3) retrieving the sports information from the database according to the keyword and the priority; (4) sorting the sports information according to distances from a position of the navigation system to places where games related to the retrieved sports information are held; and (5) displaying the sorted sports information on the display device.

The second object of the present invention can be achieved by a sports information viewing method comprising the steps of: (1) forming a database of sports information including current sports information and past sports information in a memory; (2) setting a keyword and priority for retrieving the sports information; (3) retrieving the sports information from the database according to the keyword and the priority; (4) sorting the sports information according to distances from a position of the navigation system to places where games related to the retrieved sports information are held; (5) determining whether sports information is selected by a voice command for displaying the sports information on the display; (6) displaying the sorted sports information on the display device if the sports information is selected by the voice command.

According to the present invention, when sports information is selected from a menu, the favorite team score is displayed on the first page of the display on the monitor of the navigation system. Consequently, it is not necessary to conduct selection operations to obtain the target sports information while driving the vehicle, which allows the driver to safely drive the vehicle. Further, the user can set his/her favorite sports, favorite teams, or favorite players in the designed menu so that only desired sports information can be extracted from the sports information. If the user does not set his/her favorite team, sports information on local teams sorted by an order of distance will be displayed on the first page of the screen. If there is no local team, the information listed in the order of the distance is displayed. Further, the sports information controller can be arranged so that when the user selects a voice recognition system in the navigation system and gives voice commands, the sports information is display on the display device from any screen.

Other features and advantages of the present invention will be apparent from the following description taken in conjunction with the accompanying drawings.

BRIEF DESCRIPTION OF THE DRAWINGS

FIGS. 3A-3C illustrate examples of data structure of map information including POI (Point of Interest) information stored in the data storage medium, such as a CD-ROM, a DVD or a hard disc, and sports information transmitted from a sports information sever.

DETAILED DESCRIPTION OF THE INVENTION

The present invention will be described in detail with reference to the accompanying drawings. The present invention is designed to easily and quickly retrieve and display favorite sports information sorted by predefined keywords, etc., or sorted by an order of distance from a current position to a place where the game is held. While a vehicle navigation system is explained for an illustration purpose, the present invention can also be applied to other types of navigation system. For example, the present invention can be advantageously used in a portable navigation device such as a one implemented in a PDA (personal digital assistant) device, a laptop computer, or other hand-held devices.

Figure 1:
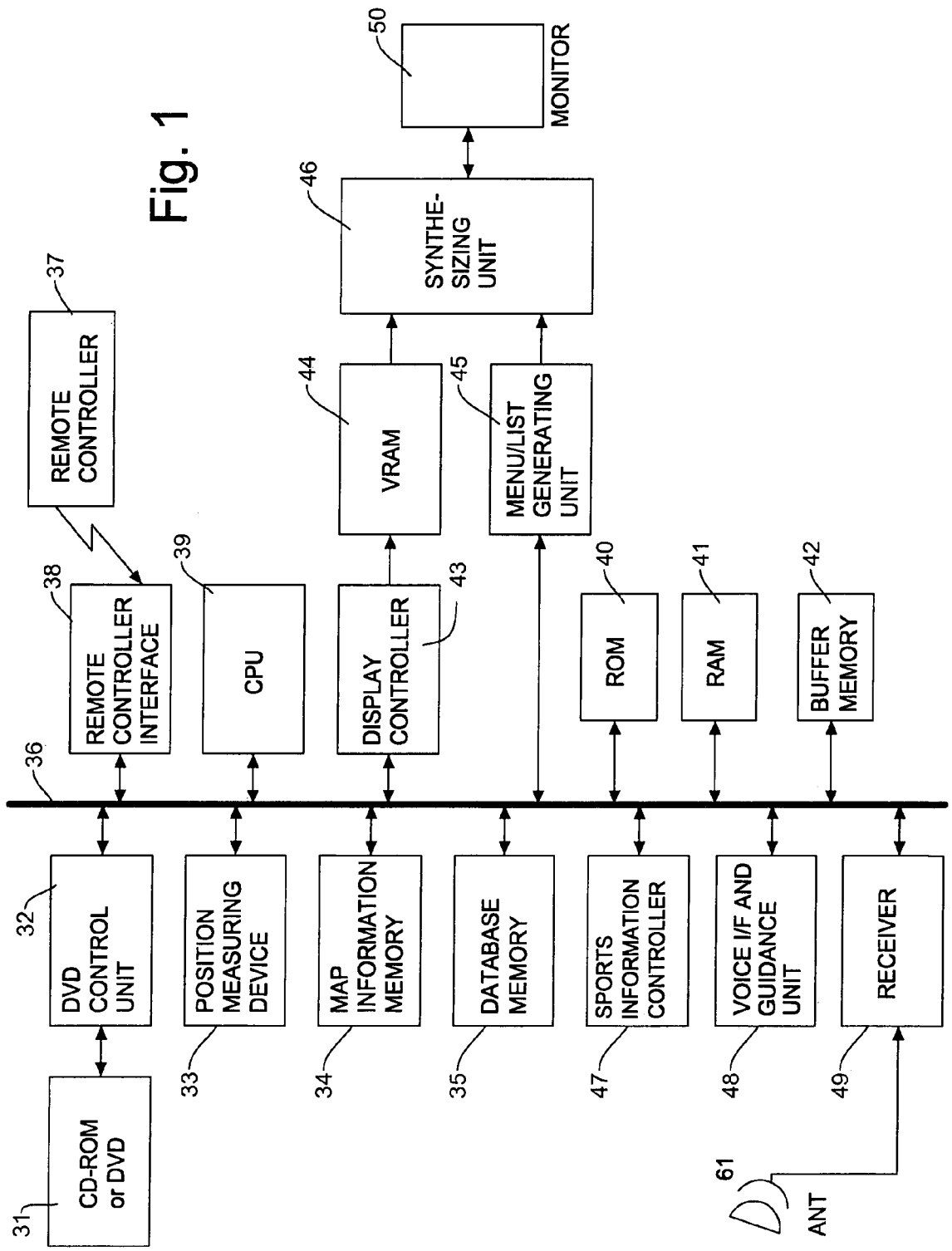
FIG. 1 illustrates a block diagram showing an example of structure in a vehicle navigation system for implementing the sports information viewing method and apparatus of the present invention.

FIG. 1 illustrates a block diagram showing an example of a structure in a vehicle navigation system for implementing the sports information viewing method and apparatus of the present invention. The navigation system includes a map storage medium 31 such as a CD-ROM, a DVD, a hard disc or other storage means (Hereafter "DVD 31") for storing map information, a DVD control unit 32 for controlling an operation for reading the map information from the DVD 31, a position measuring device 33 for measuring the present vehicle position. The position measuring device 33 has a vehicle speed sensor for detecting a moving distance, a gyroscope for detecting a moving direction, a microprocessor for calculating a position, and a GPS receiver for receiving GPS signals from GPS satellites.

The block diagram of FIG. 1 further includes a map information memory 34 for storing the map information, which is read out form the DVD 31, a database memory 35 for storing database information such as point of interest (POI) information, which is read out from the DVD 31, a remote controller 37 for executing a menu selection operation, an enlarge/reduce operation, a destination input operation, a scrolling operation of a screen on the monitor 50, etc. and a remote controller interface 38.

The navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a buffer memory 42 for storing sports information, which is downloaded from the sports information sever 51 (FIG. 2), a display controller 43 for generating map image (a map guide image and an arrow guide image) on the basis of the map information, a VRAM (Video RAM) 44 for storing images generated by the display controller, a menu/list generating unit 45 for generating menu image/various list images, a synthesizing unit 46, a sports information controller 47 for controlling data of the map information, the sports information and current position data from the position measuring device 33 to extract target sport information and display it onto a monitor, a voice interface and guiding unit 48 for voice communication interface and spoken instructions, a receiver 49 for receiving the sports information through broadcasting system including a satellite radio and a monitor (display) 50.

A sports information controller 47 performs the essential function of the present invention for providing the target sports information in accordance with keywords or priorities associated with the target sports information set by a user of the navigation system. The sports information controller 47 obtains the target sports information by evaluating various sports information and the keywords stored in a memory such as a buffer memory 42 and the map information from the memory 34 and the position data from the position-measuring device 33.

Figure 2:
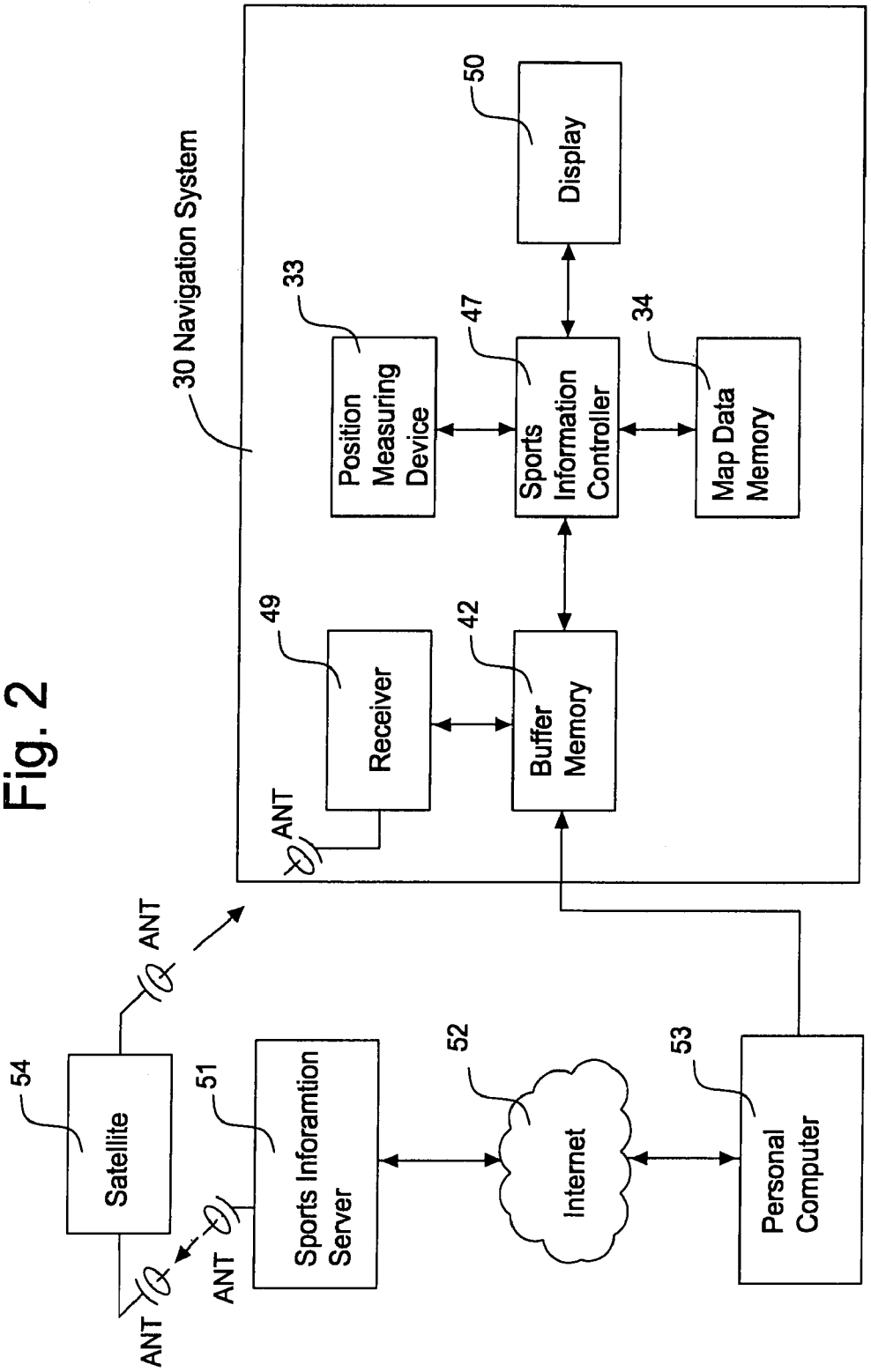
FIG. 2 illustrates a functional block diagram showing a basic structure of the sports information viewing method and apparatus of the present invention and a sports information server.

The sports information will be supplied from a sports information server 51 shown in FIG. 2 directly through an antenna 61 and a receiver 49 or indirectly through public communication networks. As noted above, the map information and POI (Point Of Interest) data, which includes stadiums, sports centers and arenas, etc., are extracted from the DVD 31 and stored in the databases memory 35. In this embodiment, the receiver 49 is arranged to wirelessly receive the sports information through the antenna 61. Alternatively, a satellite receiver (not shown) may also be arranged to receive the sports information from a satellite 54 through satellite radio signals.

FIG. 2 is a functional block diagram showing an example of basic configuration of the sports information viewing apparatus of the present invention. The configuration of FIG. 2 illustrates the components in the block diagram of FIG. 1, which are directly related to the operation of the present invention. The major components in the navigation system include the position measuring device 33, sports information controller 47, map data memory 34, buffer memory 42, receiver 49, and monitor 50. The sports information controller 47 may be implemented by the CPU 39 in the block diagram of FIG. 1 or by a separate controller such as a microprocessor.

As shown in FIG. 2, the navigation system 30 is arranged to retrieve the sports information from the sports information server 51 through a wireless communication or wired communication network including FM radio data service, satellite radio data service, telephone network, Internet, etc. Sports information from a sports information server 51 can be uploaded to the satellite 54. Then the receiver 49 in the navigation system 30 receives the sports information from the satellite 54. The sports information is stored in the buffer memory 42.

Alternatively, a personal computer 53 downloads the sports information from the sports information server 51 through a public communication network such as Internet 52. Then, the downloaded data may be copied in the buffer memory 42 by means of a storage device, such as a memory card. Thus, a database will be constituted in the buffer memory 42 by the current sports information as well as the past sports information downloaded in the manner noted above.

The sports information controller 47 controls to store the keywords and priority data of the sports information inputted by the user in, for example, the buffer memory 42. The keywords and priority data will be used when retrieving necessary sports data from the buffer memory 42. The sports information controller 47 extracts target sports information from various sports information downloaded into the buffer memory 42 based on the keywords and priorities set by the user in advance.

FIGS. 3A-3C illustrate examples of data structure of the map information including POI (Point of Interest) information stored in the data storage medium, such as a CD-ROM, a DVD or a hard disc, and sports information downloaded from the sports information sever 51. FIG. 3A illustrates an example of a data structure of the map information, FIG. 3B illustrates an example of data structure of POI information in the map information, and FIG. 3C illustrates an example of sports information, which has been stored in the buffer memory 42.

In FIG. 3A, the map information is composed of (1) road layers including road link data (RLDT), node link data (NDDT) and intersection data (CRDT), (2) background layers for displaying objects on a map, such as roads, buildings, parks, and lakes (3) character layers for displaying characters, such as names of cities, towns, and villages, and (4) POI (Point Of Interest) layers for displaying POI icons appropriately at predetermined position of POIs, and other matter. The node link data (NDDT) is a list of all the nodes constituting the road, and is composed of positional information (longitude, latitude) for each node.

As shown in FIG. 3B, the POI information includes (1) a longitude and latitude position of a POI (Point Of Interest), (2) a POI icon code, (3) name of road the POI faces, (4) link-constituting nodes of road of a POI (position at which the POI icon is displayed), (5) category of the POI, such as sports facility, restaurant, etc, and (6) name of the POI.

As shown in FIG. 3C, the sports information includes (1) time and date data when corresponding sports information is generated, (2) category of sports, such as football, basket ball, hokey, NBA, NFL, etc, (3) teams related to the sports information, (4) a place where the game is held, (5) score of the game and (6) player involved with the game.

According to the data structures of the map information, the POI information and the sports information illustrated in FIGS. 3A-3C, respectively, the map information, the POI information and the sports information can be correlated each other by using data commonly included in those data structures. For example, "Staples Center" in Los Angeles, Calif., is a home to the Los Angeles Clippers and the Los Angeles Lakers of the National Basketball Association, as well as the Los Angeles Kings of the National Hockey League. The sports information controller 47 is designed to determine whether "Staples Center" is included in the POI information and to search a corresponding POI including "Staples Center" as a name of stadium or arena including coordinates data (longitude and latitude).

According to the above example, the sports information controller 47 is able to correlate the sports information and the map information through the coordinate data. Further, according to the position data from the position-measuring device 33, a current position of the navigation system (user position, vehicle position) is available. Accordingly, when the sports information includes position information, such as stadium or arena name where the game is held, it is possible to correlate the sports information with the map information as well as the current vehicle or user position.

The sports information controller 47 is also arranged to filter various sports information downloaded into the buffer memory 42 based on a distance between the stadium or arena where the game related to the sports information and current user position by utilizing the correlation between the sports information and the map information. For example, if 100 miles is set as the distance for filtering sports information in advance, the sports information of a game held in an area within a radius of 100 miles from the current position will be downloaded. To do this, the sports information controller 47 also utilizes the position data from the position-measuring device 33 and the map data from the map data memory 34.

Figure 4:
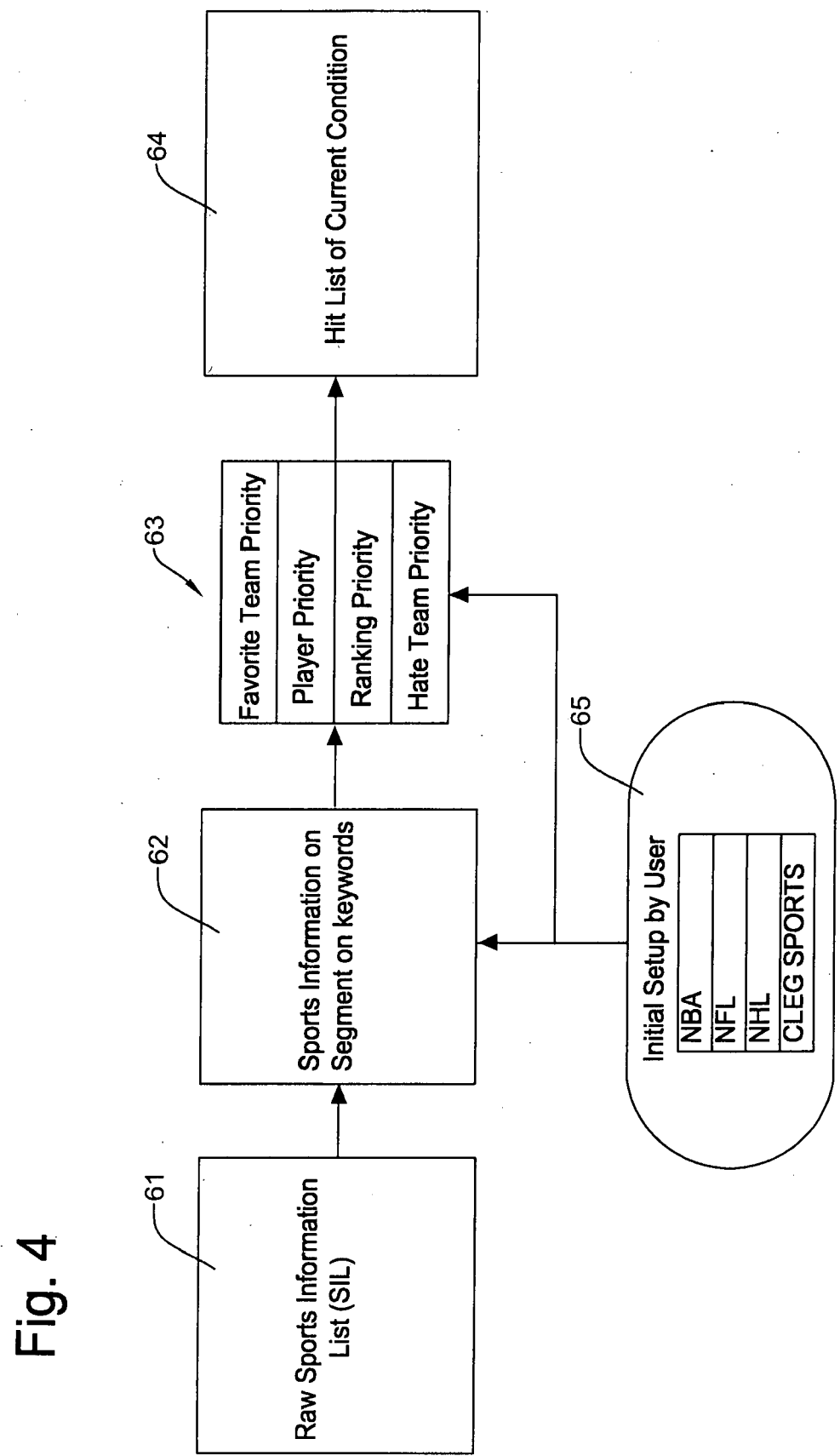
FIG. 4 illustrates a diagram showing a basic operation flow for selecting keywords and priorities for retrieving desired sports information in accordance with the present invention.

FIG. 4 shows a sports information extraction process and a configuration for retrieving the favorite sports team information based on the keywords and priorities specified by the user. From the sports information server 51 (FIG. 2), the navigation system 30 downloads the sports information and stores the sports information in the buffer memory 42. Thus, the buffer memory 42 functions as a sports information database which stores past sports information and current sports information. In FIG. 4, such sports information is accumulated in a list of "Raw Sports Information List (SIL)" 61 in the buffer memory 42. Thus, the SIL 61 functions as a primary database for the sports information viewing method and apparatus of the present invention.

The content of the sports information in the SIL 61 is typically arranged by such parameters as (1) time and date data when corresponding information is generated, (2) category of sports, such as football, basket ball, hokey, NBA, NFL, etc, (3) teams related to the sports information, (4) places where the games are held, (5) scores of the game and (6) players involved as shown in FIG. 3C. From the raw data in the SIL 61, necessary sports information will be extracted in response to the various keywords, such as NBA, NFL and NHL, and the priority, which the user has set in the system in advance.

The time and date data of the game provides the information on the time and date when the information is generated. The place data provides an accurate position where the game has been or being held. Normally, the names of stadium, arena, college, city, or town are used for such a purpose. In general, the sports information delivered through the broadcasting networks or public telephone networks includes the name of the stadium or arena where the game is carried out.

Alternatively, the map information includes the stadium or arena information as POI (Point of Interest) data with accurate latitude and longitude data as illustrated in FIGS. 3B and 3C. Thus, when the sports information is downloaded, the navigation system is instructed to use the latitude and longitude data so as to correlate the sports information with the map information. The sports category provides a sports type such as NBA (National Basketball Association), NFL (National Football League), NHL (National Hockey League), College Sports, etc. The score data provides a score of the game, high lights of the game, and a score change occurred and associated player, etc.

When setting the navigation system, the user defines various parameters for the navigation system to retrieve the target sports information through a system setup process. An example of such parameters is shown in a block 65, which lists "NBA", "NFL", "HHL" and "CLEG SPORTS", which stands for college sports, for the initial system setup by the user. The "NBA" is to filter the sports information with selected priorities, such as a favorite team priority, player priority, ranking priority, and hate team priority.

In this embodiment, the sports information viewing apparatus in the navigation system is arranged to extract sports information according to the keywords and the priorities specified by the user. However, when no keyword or priority is set, the local sports information is selected based on the distance between the current vehicle or user position and the place where the game is held. In this embodiment, all local sports information concerning games held in an area within a radius of 100 miles from the current position is extracted and displayed on the monitor 50 in the navigation systems. The distance radius may be changed according to an input operation by the user.

With regard to a recency factor (time period) of the sports information, "7 days" is automatically selected as a default setting in this embodiment. Thus, the navigation system selects sports information which is generated during the last seven (7) days. The navigation system extracts the information including the games held in an area within a radius of 100 miles from the current position from the sports information in the buffer memory 42.

In FIG. 4, a data block 62 indicates such sports data extracted based on the keyword, the distance, and the time period described above. The sports information in the data block 62 is further filtered in response to the priority selected by the user. An example of priority items is shown in a block 63, which includes (1) favorite team priority, (2) player priority, (3) ranking priority, and (4) hate team priority. During the extracting process of target sport information in the present invention, the user selects one or more priorities so that the sports information is further narrowed down based on the selected priority. For example, if the user selects only the favorite team priority, the sports information associated with the favorite team specified by the user is retrieved.

Namely, the "Favorite team priority" is to detect the sports data only related to the favorite teams. For example, Atlanta Falcons and Buffalo Bills for football teams and LA Lakers and Miami for basketball teams, etc., may be set in advance as favorite teams. The "Player priority" is to retrieve the sports data related to the favorite player or players in the favorite teams or other teams. The "Ranking priority" is to extract the sports data related to a ranking of the league of the specified sports. The "Hate Team Priority" is to detect the sports data of a team that the user hates.

Based on the keywords and the priority conditions selected by the user, the navigation system retrieves the sports information, thereby creating a hit list of current conditions in a block 64. The sports information controller 47 analyzes the retrieved data to display the information on the monitor 50 in the predefined manner.

A simple example of extracting information related to Arizona Cardinals as a favorite team, which is one of NFL team, will be described below. It is assumed that a route to the destination is already established. The sports information list (SIL) 61 includes information downloaded from the sports information server 51, which has been generated last 7 days in the United States.

FIGS. 5A-5D illustrate schematic diagrams showing an example of process and display screens for setting NBA (National Basketball Association) as sports information to be extracted and further narrowing down the information to the information related to Arizona Cardinals as a favorite team. In FIGS. 5A-5D, "Enter" denotes an operation of ENTER KEY (not shown) which is equipped with a remote controller 37 or on a touch screen (monitor 50) of the navigation system 30 for confirming the selection on the screen. "Cancel" denotes a CANCEL KEY (not shown) for canceling the current display screen for returning to previous screen.

Figure 5A:
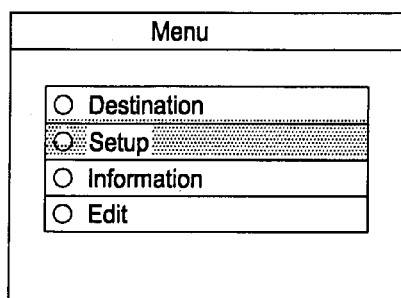
FIGS. 5A-5D illustrate schematic diagrams showing an example of process and display screens for setting an NFL (National Football League) team in the sports information viewing method and apparatus of the present invention.
Figure 5B:
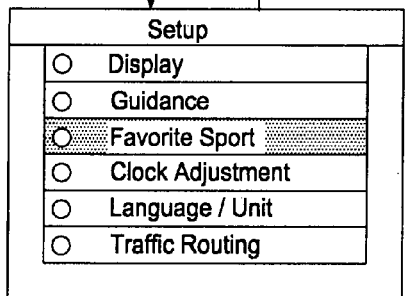

The background of this operation is that a user of the navigation system wants to know the score of the game or the sports information related to the Arizona Cardinals if any. For setting the favorite sports in FIGS. 5A-5D, at first, the user selects a "Menu" screen as shown in FIG. 5A to setup the navigation system. By selecting a "Setup" menu, the items for setting up the navigation system are displayed as shown in FIG. 5B.

Figure 5C:
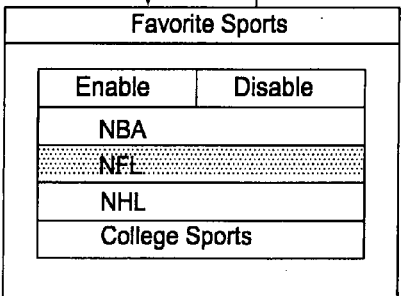

Then, by selecting "Favorite Sports", the navigation system displays a list of items for the initial setup concerning the favorite sports as shown in FIG. 5C. In the example of FIG. 5C, the "Favorite Sports" screen includes "NBA", "NFL", "NHL" and "CLEG SPORTS". If the user does not want the "Favorite Sports" screen, he can disable this function by selecting a "Disable" menu. If the "Favorite Sports" menu is selected in FIG. 5C, the "Favorite Team Setting" screen is displayed as shown in FIG. 5D.

Figure 5D:
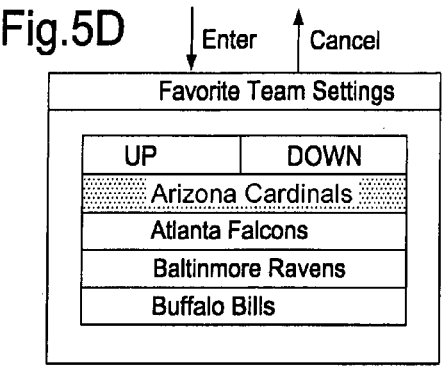

The "Favorite Team Setting" screen of FIG. 5D alphabetically lists teams belonging to the favorite sport selected in the process shown in FIG. 5C. In this example, a part of the teams in the NFL such as "Arizona Cardinals", "Atlanta Falcons" "Baltimore Ravens", and "Buffalo Bills" are displayed on the screen as the teams in NFL. After selecting the "Arizona Cardinals", the user presses the Enter key to execute the selections.

Figure 6A:
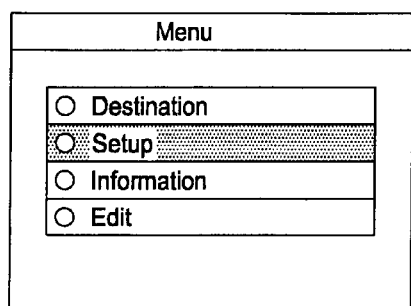
FIGS. 6A-6E illustrate schematic diagrams showing an example of process and display screens for setting an NBA (National Basketball Association) team in the sports information viewing method and apparatus of the present invention.
Figure 6B:
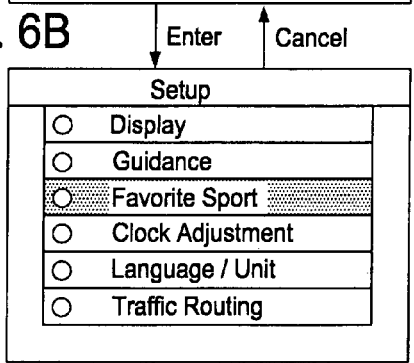
Figure 6C:
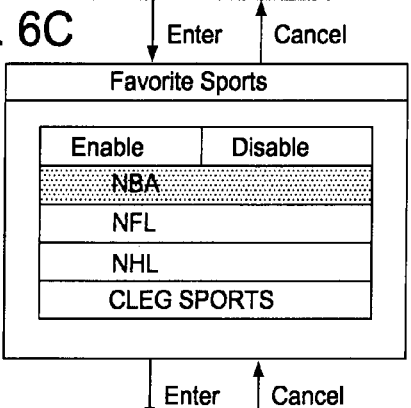
Figure 6D:
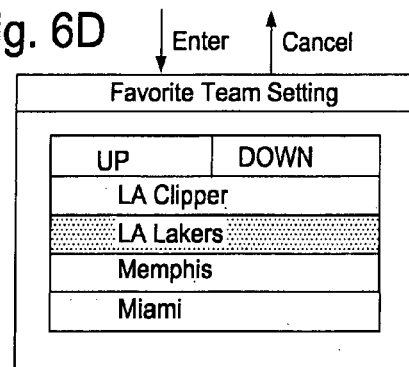

FIGS. 6A-6D illustrate schematic diagrams showing an example of process and display screens for setting a NBA (National Basketball Association) team in the sports information viewing method and apparatus of the present invention. In setting the favorite team in FIGS. 6A-6D, the processes illustrated in FIGS. 6A and 6D are the same as those of FIGS. 5A and 5B which illustrate the initial setup of the favorite team setting.

Figure 6E:
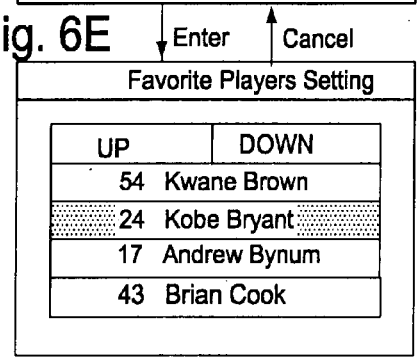

In the example of FIG. 6C, the user selects the NBA in the favorite sports screen. In the "favorite team setting" screen of FIG. 6D, after selecting the favorite team "LA Lakers", the user pushes the enter key to proceed to the next step for selecting favorite player in the favorite team. The navigation system prompts the user to select favorite player from the list which lists the player's names and numbers as shown in FIG. 6E. By highlighting a favorite player and pressing the enter key, the initial setup process for setting the NBA favorite player is completed.

When selecting other favorite sports teams, the same way described above will be applied. Further, the sports information viewing method and apparatus of the present invention is designed to select not only a single favorite sport and a single player, but also multiple sports and multiple players as well by selecting additional favorite sports and additional favorite players. In the foregoing example, the sports information viewing method and apparatus of the present invention is designed to specify a time period (recency) of the sports information to seven (7) days. However, it is also possible to limit to other time period such as one month, one whole season, etc. It is also possible to design the navigation system having a program for setting the recency days, which runs on the CPU 39.

Figure 7:
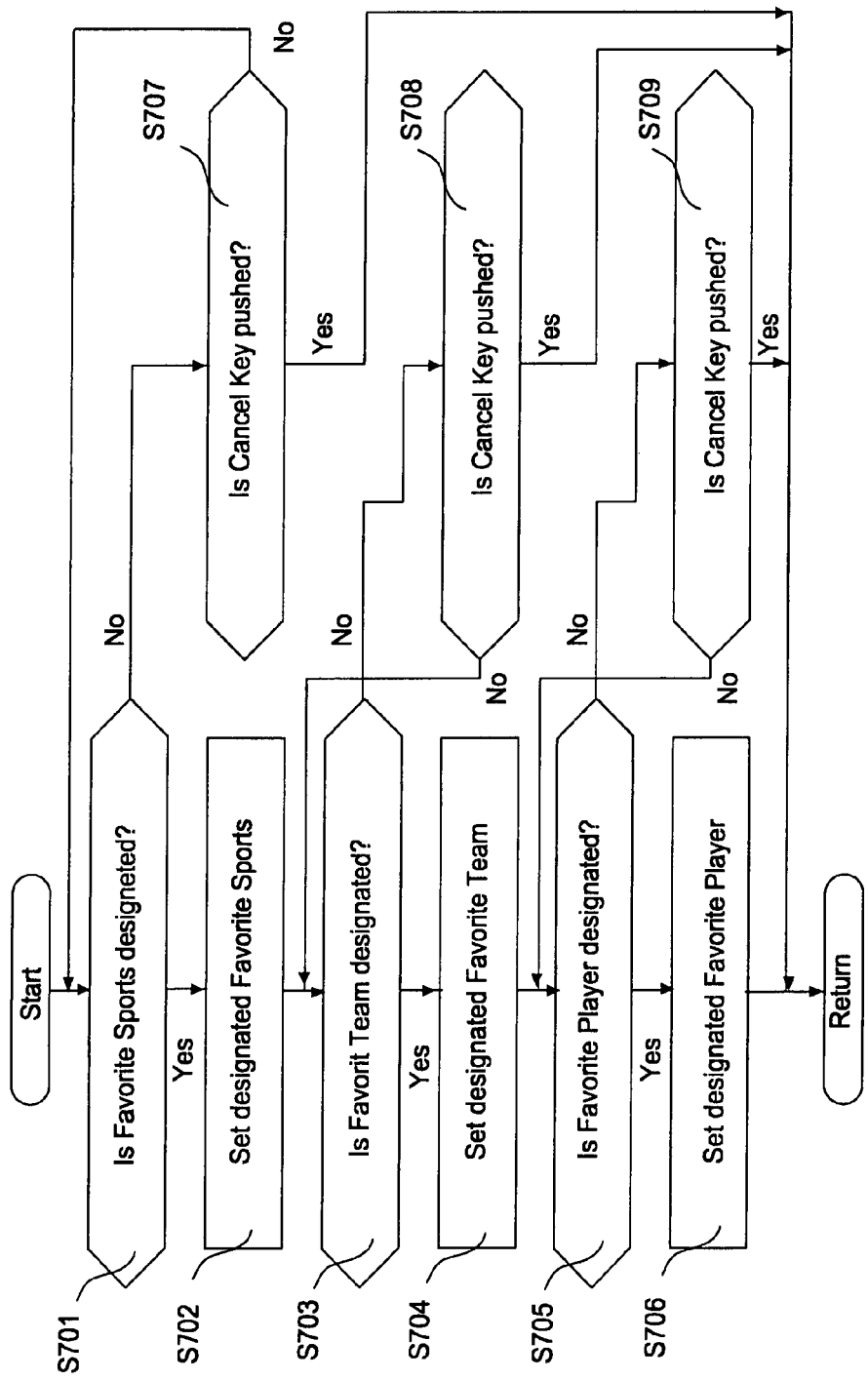
FIG. 7 illustrates a flowchart showing an example of process for setting keywords into a hit list of a current condition illustrated in FIG. 2.

Next, with reference to the flowcharts of FIGS. 7 and 8, the processes of extracting necessary sports information and displaying the extracted sports information will be described. FIG. 7 illustrates a flowchart showing an example of process for setting keywords illustrated in FIG. 4. The sports information controller 47 (FIGS. 1 and 2) determines whether the favorite sports type is selected as in the step S701, which corresponds to the operation shown in FIG. 6C. If the ENTER KEY is pushed, which means "Yes", the sports information controller 47 determines that the designated favorite sports category is set, thus, the process moves to the step S702.

If the ENTER KEY is not pushed, which means "No" in the step S701, the sports information controller 47 checks whether the cancel key is pushed in the step S707. When the cancel key is pushed, which means "Yes" in the step S707, the process moves to the return process, which is a routine for moving back to the previous screen. When the cancel key is not pushed, which means "No" in the step S707, then the process moves back to the step S701 again. In the step S702, the user sets the favorite sports category, for example, "NBA", "NFL", "HHL" or "CLEG SPORTS", thereby moving the process to the step S703.

Then, the sports information controller 47 determines whether the favorite team is selected at the step S703 and whether a favorite player is designated at the step S705, respectively. Through the steps S701-S709, necessary keywords for narrowing down the sports information are set. Such keywords include favorite teams (step S703) and the favorite players (step S705) as noted above. The processes described with respect to the steps S701-S709 correspond to the screens illustrated in FIGS. 6C-6E.

Figure 8:
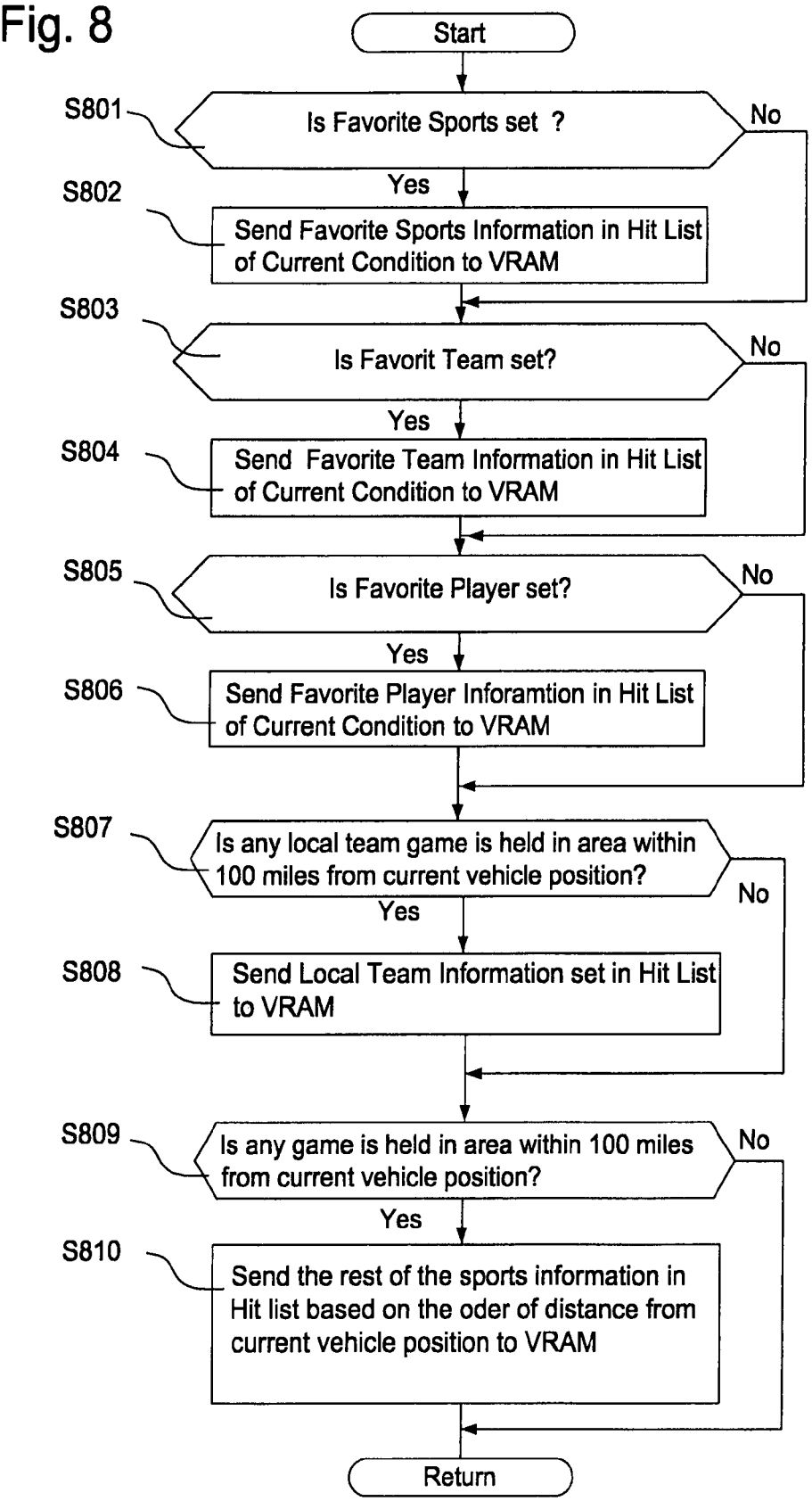
FIG. 8 illustrates a flowchart showing an example of process for display sports information extracted from a raw sports information list illustrated in FIG. 2.

FIG. 8 illustrates a flowchart showing an example of process for displaying the sports information extracted from the raw sports information list (SIL) 61 shown in FIG. 3. Once the initial setup process has been completed, the navigation system 30 starts the operation. The receiver 49 starts receiving the sports information from the satellite 54 or other source and storing the sports information in the buffer memory 42.

In the step S801, the sports information controller 47 checks whether there is sports information concerning the favorite sports type which has been designated in the navigation system in advance. When the sports information controller 47 detects the information including the designated favorite sports, which means "Yes", in the step S801, the sports information controller 47 sends the data corresponding to the designated favorite sports to the VRAM 44 to display the data on the monitor 50 in the step S802. In this example, the navigation system is designed to display the data on the first page (on the top screen) on the monitor 50 just like a pop-up screen in the personal computer application. The monitor 50 also displays other information, such as map or direction to the destination, so that the driver can enjoy the navigation function as well.

Figure 9:
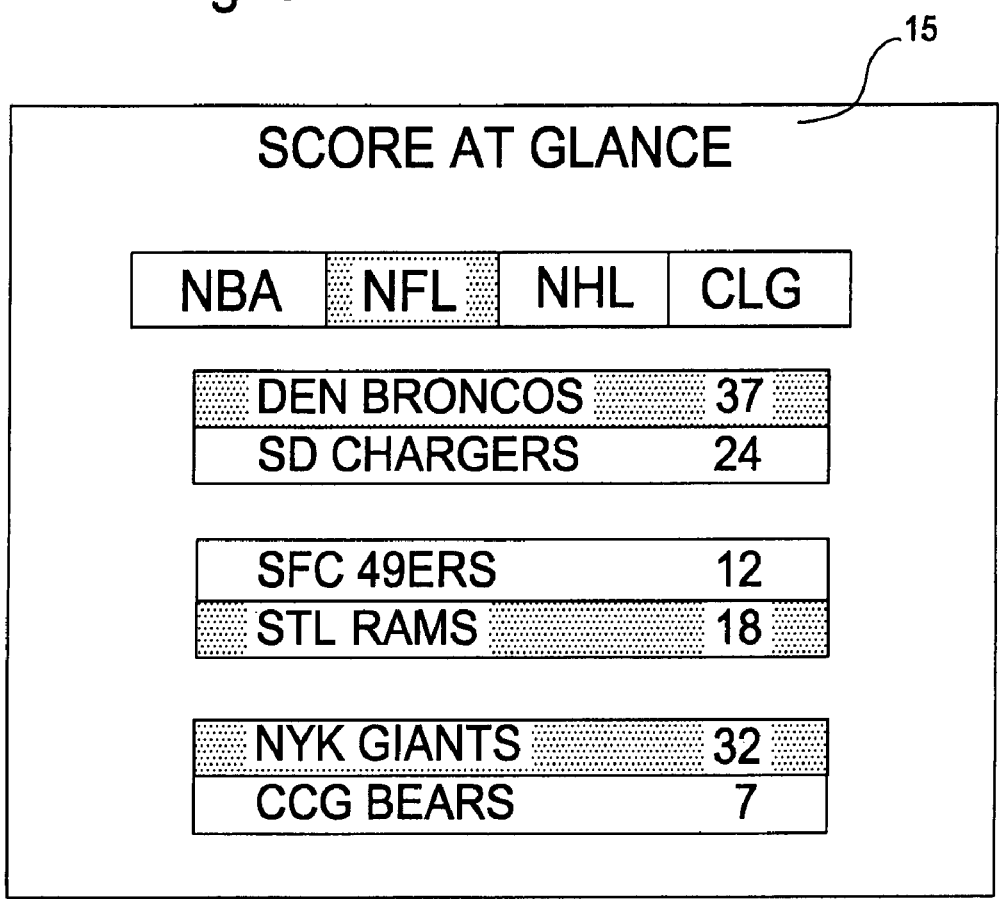
FIG. 9 illustrates a display screen showing an example of scores of the NFL teams, which have been set in advance, displayed on the screen of the vehicle navigation system for implementing the sports information viewing method and apparatus of the present invention.

FIG. 9 illustrates a screen showing an example of scores of the NFL teams displayed on the screen of the vehicle navigation system for implementing the sports information viewing method and apparatus of the present invention. The NFL teams have been designated in advance through the setup process of FIGS. 5A-5D. The example of FIG. 9 shows the case in which the NFL has been set as a favorite sports category, and Denver Broncos and STL RAM have been set as a favorite sports team and New York Giants has been set as a hate team.

When, the game starts, zero (0) score is displayed with flashing, which denotes that the game is continuing. When the score changes, the changed score is flashing so that the user can recognize that the score has changed and the game is continuing. When no flashing is shown, the user knows that the game has finished. By using the similar principle, the navigation system can indicate that the games are still continuing may be shown by flashing the location of the stadium, etc. on the map image on the monitor 50.

Figure 10A:
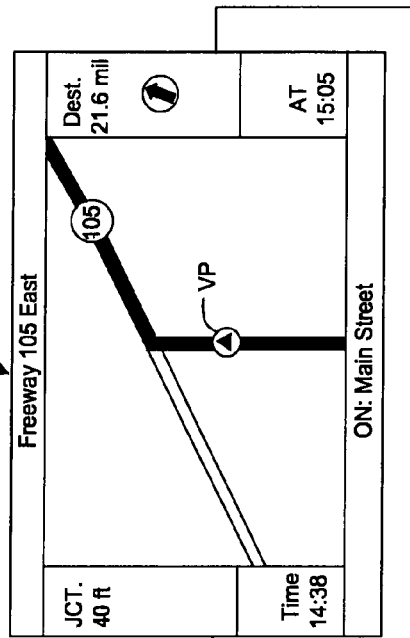
FIGS. 10A-10D are schematic diagrams showing an example of process and display screens in which a pop-up screen showing sports information is displayed on the top page of the screen of the navigation system for implementing the sports information viewing method and apparatus of the present invention.
Figure 10B:
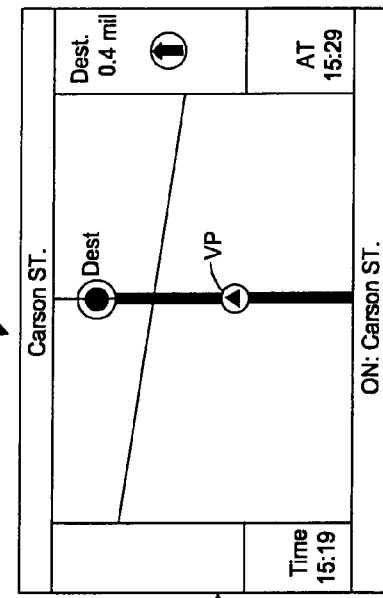

FIGS. 10A-10D illustrate schematic diagrams showing an example of process and display screens in which a pop-up screen showing sports information is displayed on the first page (the top) of the screen of the navigation system for implementing the sports information viewing method and apparatus of the present invention. FIGS. 10A-10B show the map screen directing to the driving destination, which has been set in advance. When the navigation system receives the latest sports information, the screen including the latest sports information is displayed on a pop-up screen on the display of the navigation system.

Figure 10C:
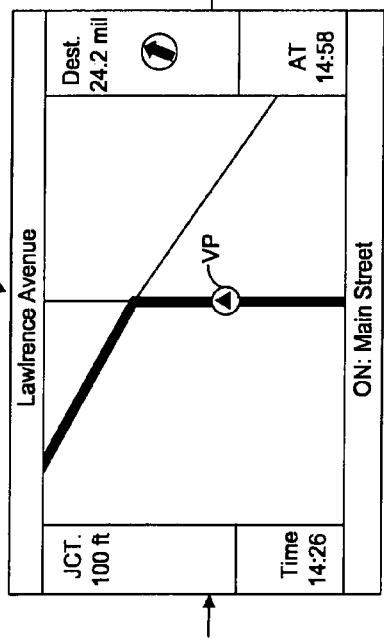
Figure 10D:
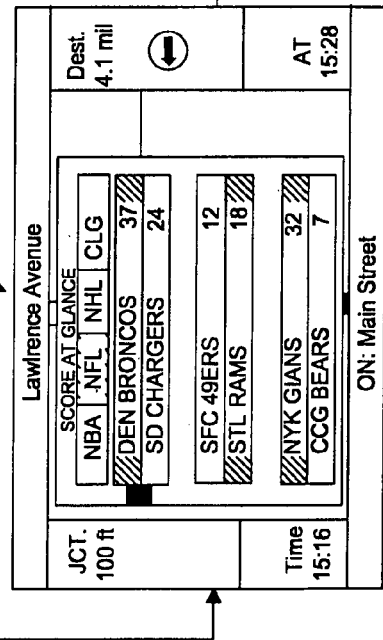

In this case, the sports information is configured by scores of three teams which have been designated in advance associated with contenders for respective teams. In this example, the scores of respective teams are displayed. Further in this example, the pop-up screen as illustrated in FIG. 10C is displayed for a predetermined time length, such as two minutes, and the screen resumes to the map screen. FIG. 10D shows the case where the pop-up screen disappears after the predetermined time length and the navigation system returns to the normal screen.

Referring back to the flowchart of FIG. 8, when it is determined that the favorite sports category has not been set in the step S801, which means "No", the sports information controller 47 is arranged to check whether the favorite team has been set in the step S803. If the favorite team has been set, which means "Yes" in the step S803, then the sports information controller 47 sends the favorite team information in the hit list 64 to the VRAM 44 in the step S804 to display the favorite team information even though the favorite sports has not been designated. Then the sports information controller 47 determines whether the favorite player has been set in the step S805. When the favorite player has been set, which means "Yes" in the step S805, the sports information controller 47 sends the favorite player information to VRAM 44 in the step S806.

When no favorite player is registered in the Hit List 64 in the step S805, which means "No", then the sports information controller 47 determines whether any local team game is held in the area within a predetermined distance (in this embodiment the distance has been set to 100 miles) from the current vehicle position in the step S807. The local teams can also be registered by means of the processes described with reference to FIGS. 5A-5D and 6A-6E. When there is sports information including the local team games or players, which means "Yes" in the step S807, the sports information controller 47 sets the sports information of the local team to the VRAM 44 in the step S808 so that the local team information is displayed on the monitor screen 50 instead of the favorite sports information.

When no local team information available in the area, which means "No" in the step S807, the sports information controller 47 is arranged to determine whether any other games are held within an area of the predetermined distance from the current position in the step S809. When there is sports information, which means "Yes" in the step S809, then the sports information controller 47 is arranged to sort the available sports information in the order of the distance between the place where the game related to the sports information is held and the current position and sent the sports information to the VRAM 44 to display it onto the monitor 50 in the step S810. Accordingly, even when the user misses the favorite sports information, information of the local team games, which is held in a local stadium or an arena, etc., can be obtained.

The sports information controller 47 may be arranged to display new sports information when the navigation system receives the new sports information. Consequently, the user is able to enjoy the latest sports information as soon as the new sports information is available. For example, the sports information controller 47 controls the navigation system to retrieve the new sports information based on the keywords and priorities set by the user so that the sports information is automatically updated every time when the new information is available.

Figure 11:
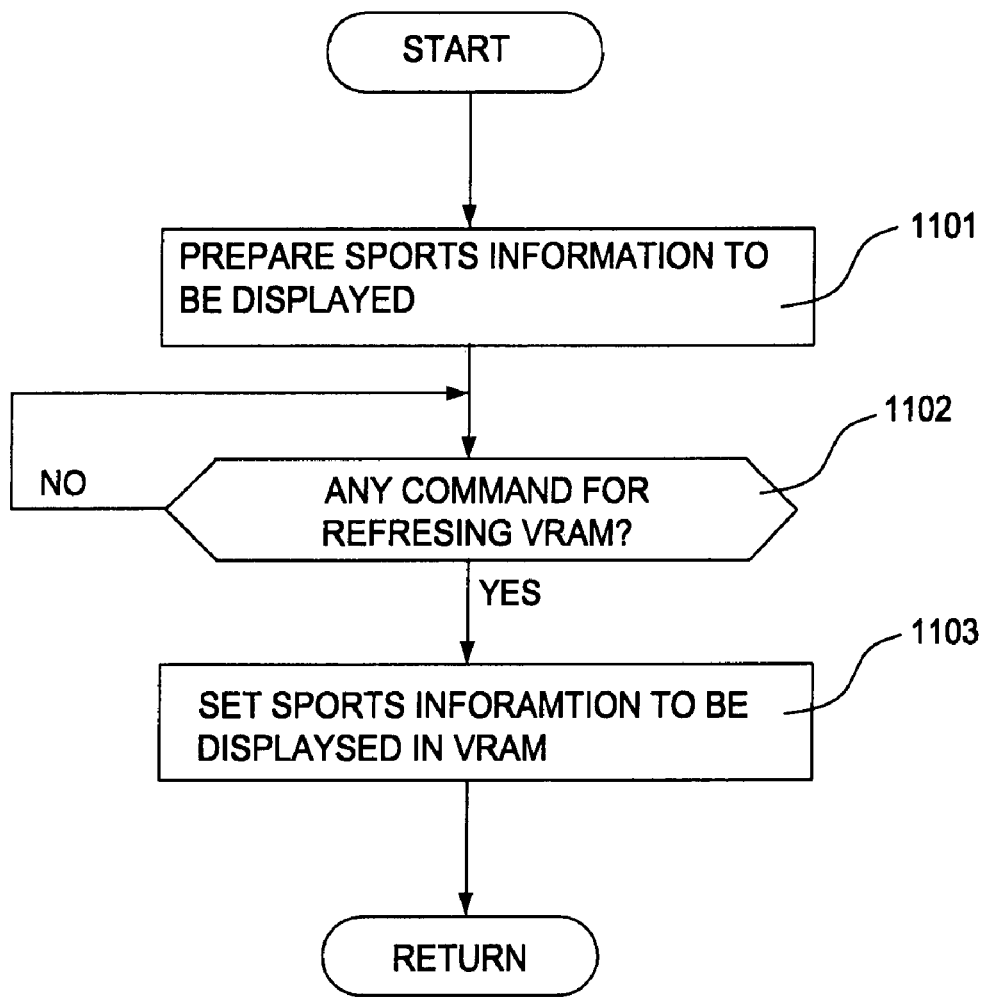
FIG. 11 illustrates a flowchart showing an example of process for displaying sports information when a user gives a command to the navigation system for implementing the sports information viewing method and apparatus of the present invention.

FIG. 11 illustrates a flowchart showing an example of a process for displaying the sports information in accordance with the present invention. The sports information controller 47 is designed to display data set in the VRAM 44 as soon as the data is ready. Accordingly, the sports information controller 47 controls the timing of displaying the sports information on the monitor screen 50 by controlling the timing of the command for writing the data into the VRAM.

In FIG. 11, the sports information controller 47 is arranged to prepare sports information to be displayed in the step S1101. Then the process checks whether there is any command for refreshing or writing the VRAM 44 in the step S1102. When the command has issued, which means "Yes" in the step S1102, the sports information controller 47 controls to refresh the VRAM 44 with new sports information so that the new sports information is displayed on the monitor screen 50 in the step S1103.

In this embodiment, the voice I/F (interface) and guidance unit 48 (FIG. 1) is designed to recognize commands by voice pronounced by the user. Examples of such voice commands include, such as "Menu", "Enter", "Cancel", "Music", "Sports", "Favorite Sports", "Favorite Team", and "Favorite Player". This voice recognition function allows the user (driver) to safely drive the vehicle, because the driver does not need to touch the switches on the vehicle navigation system or see the menus on the monitor 50. Thus, in this embodiment, instead of using the "ENTER KEY", the sports information controller 47 may be designed to recognize voice commands such as "Sports Information" and "Enter" for displaying the sports information including the score of game of the favorite team on the first page (top screen), by refreshing the VRAM with the sports information based on a voice command.

As has been described in the foregoing, according to the present invention, when sports information is selected from a menu, the favorite team score is displayed on the first page of the display on the monitor of the navigation system. Consequently, it is not necessary to conduct selection operations to obtain the target sports information while driving the vehicle, which allows the driver to safely drive the vehicle. Further, the user can set his/her favorite sports, favorite teams, or favorite players in the designed menu so that only desired sports information can be extracted from the sports information. If the user does not set his/her favorite team, sports information on local teams sorted by an order of distance will be displayed on the first page of the screen. If there is no local team, the information listed in the order of the distance is displayed. Further, the sports information controller can be arranged so that when the user selects a voice recognition system in the navigation system and gives voice commands, the sports information is display on the display device from any screen.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. A sports information viewing method for a navigation system designed for receiving sports information and displaying the sports information on a display device, the method comprising the following steps of:

forming a database of sports information including current sports information and past sports information in a memory;

setting a keyword and priority for retrieving the sports information;

retrieving the sports information according to the keyword and the priority;

sorting the sports information according to an order of the distance from a current position of the navigation system to a place where a game corresponding to the sports information is held; and displaying the retrieved sports information on the display device according to the order of the distance from a current position of the navigation system.

2. The sports information viewing method of the claim 1, further comprising a step of filtering the sports information by a predetermined distance from the current position of the navigation system.

3. The sports information viewing method of the claim 1, wherein the step of forming the database includes a step of receiving the sports information from a sports information server via a wired or wireless communication.

4. The sports information viewing method of the claim 1, wherein the step of setting a keyword and priority includes a step of specifying a type of sports, a favorite team, or a favorite player for retrieving sports information from the database.

5. The sports information display method of the claim 1, wherein the retrieved sports information is displayed in response to reception of new sports information to update the sports information.

6. A sports information viewing method for a navigation system having a voice recognition device for receiving a voice command, the navigation system being designed for receiving sports information and displaying the sport information in multiple windows on a display device, the method comprising the steps of:

forming a database of sports information including current sports information and past sports information in a memory;

setting a keyword and priority for retrieving the sports information;

retrieving the sports information according to the keyword and the priority;

sorting the sports information according to an order of the distance from a current position of the navigation system to a place where a game corresponding to the sports information is held;

determining whether sports information is selected by the voice command for displaying the sports information on the display; and displaying the retrieved sports information on the display device according to the order of the distance from a current position of the navigation system if the sports information is selected by the voice command.

7. The sports information viewing method of the claim 6, further comprising a step of filtering the sports information by a predetermined distance from the current position of the navigation system.

8. The sports information viewing method of the claim 6, wherein the step of forming the database includes a step of receiving the sports information from a sports information server via a wireless or wired communication.

9. The sports information viewing method of the claim 6, wherein the step of setting a keyword and priority includes a step of specifying a type of sports, a favorite team, or a favorite player for retrieving sports information from the database.

10. The sports information viewing method of the claim 6, wherein the retrieved sports information is displayed in response to reception of new sports information to update the sports information.

11. A sports information viewing apparatus for a navigation system designed for receiving sports information and displaying the sport information on a display device, the sports information viewing apparatus comprising:

means for forming a database of sports information including current sports information and past sports information in a memory;

means for setting a keyword and priority for retrieving the sports information;

means for retrieving the sports information according to the keyword and the priority;

means for sorting the sports information according to an order of the distance from a current position of the navigation system to a place where a game corresponding to the sports information is held; and means for displaying the retrieved sports information on the display device according to the order of the distance from a current position of the navigation system.

12. The sports information viewing apparatus of the claim 11, further comprising means for filtering the sports information by a predetermined distance from the current position of the navigation system.

13. The sports information viewing apparatus of the claim 11, wherein the means for forming the database includes means of receiving the sports information from a sports information server via a wireless or wired communication.

14. The sports information viewing apparatus of the claim 11, wherein the means for setting a keyword and priority includes means for specifying a type of sports, a favorite team, or a favorite player for retrieving sports information from the database.

15. The sports information viewing apparatus of the claim 11, wherein the retrieved sports information is displayed in response to reception of new sports information to update the sports information.

16. A sports information viewing apparatus for a navigation system having a voice recognition device for receiving a voice command, the navigation system being designed for receiving sports information and displaying the sport information on multiple windows on a display device, the sports information viewing apparatus comprising:

means for forming a database of sports information including current sports information and past sports information in a memory;

means for setting a keyword and priority for retrieving the sports information;

means for retrieving the sports information according to the keyword and the priority;

means for sorting the sports information according to an order of the distance from a current position of the navigation system to a place where a game corresponding to the sports information is held;

means for determining whether sports information is selected by the voice command for displaying the sports information on the display; and means for displaying the retrieved sports information on the display device according to the order of the distance from a current position of the navigation system if the sports information is selected by the voice command.

17. The sports information viewing apparatus of the claim 16, further comprising means for filtering the sports information by a predetermined distance from the current position of the navigation system.

18. The sports information viewing apparatus of the claim 16, wherein the means for forming the database includes means for receiving the sports information from a sports information server via a wireless or wired communication.

19. The sports information viewing apparatus of the claim 16, wherein the means for setting a keyword and priority includes means for specifying a type of sports, a favorite team, or a favorite player for retrieving sports information from the database.

20. The sports information viewing apparatus of the claim 16, wherein the retrieved sports information is displayed in response to reception of new sports information to update the sports information.

* * * * *